United States Patent
Jeong et al.

(10) Patent No.: US 9,393,955 B2
(45) Date of Patent: Jul. 19, 2016

(54) APPARATUS AND METHOD OF PROCESSING ROAD DATA

(71) Applicants: Hyundai Motor Company, Seoul (KR); Kia Motors Corporation, Seoul (KR)

(72) Inventors: Dong Hoon Jeong, Osan-Si (KR); Joseph D Chang, Yongin-si (KR); Byeong Wook Jeon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 114 days.

(21) Appl. No.: 14/140,425

(22) Filed: Dec. 24, 2013

(65) Prior Publication Data
US 2015/0019088 A1   Jan. 15, 2015

(30) Foreign Application Priority Data
Jul. 10, 2013   (KR) .................. 10-2013-0081046

(51) Int. Cl.
| B60W 50/00 | (2006.01) |
| B60W 50/04 | (2006.01) |
| B60W 40/04 | (2006.01) |
| B60W 40/072 | (2012.01) |
| B60W 30/182 | (2012.01) |
| B60W 30/188 | (2012.01) |
| B60W 30/00 | (2006.01) |
| B60W 40/06 | (2012.01) |

(52) U.S. Cl.
CPC ............. *B60W 30/00* (2013.01); *B60W 30/182* (2013.01); *B60W 30/188* (2013.01); *B60W 30/1882* (2013.01); *B60W 40/04* (2013.01); *B60W 40/06* (2013.01); *B60W 40/072* (2013.01); *B60W 2550/143* (2013.01); *B60W 2550/402* (2013.01)

(58) Field of Classification Search
CPC .................. B60W 2550/143; B60W 2550/14; B60W 40/06; B60W 40/072; B60W 40/076
See application file for complete search history.

(56) References Cited

U.S. PATENT DOCUMENTS

| 6,567,744 B1 * | 5/2003 | Katayama et al. ............. 701/410 |
| 6,675,092 B1 * | 1/2004 | Katayama et al. ............. 701/410 |
| 7,774,121 B2 * | 8/2010 | Lee et al. ......................... 701/70 |
| 7,796,081 B2 * | 9/2010 | Breed .............................. 342/70 |
| 2007/0250263 A1 * | 10/2007 | Yamada ........................ 701/207 |

FOREIGN PATENT DOCUMENTS

| JP | 5028851 B2 | 11/2007 |
| JP | 4968412 B2 | 4/2012 |

* cited by examiner

*Primary Examiner* — Jacob S Scott
*Assistant Examiner* — Tinh Dang
(74) *Attorney, Agent, or Firm* — Morgan, Lewis & Bockius LLP (57) ABSTRACT

An apparatus for processing road information includes: a global positioning system (GPS) sensor configured to detect a location of a vehicle; a navigation device configured to output short-range road information and long-range road information according to a location of the vehicle; and a vehicle controller configured to restore forward road information by using the short-range road information and the long-range road information and control an engine or a transmission according to the forward road information.

13 Claims, 6 Drawing Sheets

APPARATUS AND METHOD OF PROCESSING ROAD DATA

CROSS-REFERENCE TO RELATED APPLICATION

The present application claims priority of Korean Patent Application Number 10-2013-0081046 filed Jul. 10, 2013, the entire contents of which application is incorporated herein for all purposes by this reference.

BACKGROUND OF INVENTION

1. Field of Invention

The present invention relates to an apparatus of processing road data and a method of processing road data, and more particularly, to a road information processing apparatus and method capable of providing information regarding a road for a vehicle of a driver, and controlling the vehicle according to road data.

2. Description of Related Art

Customer's satisfaction with vehicle running performance related to road information (or road data) when a vehicle is running depends upon how a vehicle runs according to customer's tendency (or style). However, customer's tendencies vary, while the same type of vehicle has single fixed performance characteristics, and thus, there may be a difference between customer's driving styles and a vehicle reaction. Thus, customers are occasionally dissatisfied with vehicle running performance. Namely, if a customer's driving style is recognized and a change of speed is controlled such that a vehicle reacts according to the customer's driving style, customer's satisfaction related to running performance may be maximized.

Thus, in order to enhance operability and mileage (or fuel efficiency) by predicting and controlling working points of a gear stage and an engine of an automatic transmission fitting geographical features of a road ahead, a method of transmitting and receiving and predicting road information is used.

Transmission of information regarding roads to an infinitely remote area at infinitely dense intervals may be the most ideal form in terms of information reconfiguration, which, however, involves physical limitations such as computation capability, memory capacity, a communication speed of an internal communication network of a vehicle, a bandwidth, and the like. Thus, information regarding a road to a finite area at intervals of a level that can be used for vehicle control by restoring information regarding a road forward (or forward road information) should be transmitted.

Also, since a severely winding road (a road in downtown, a road in a mountainous area, and the like) not allowing high speed running and a gently winding road (intercity national expressway, and the like) designed for high speed running have different degrees of sinuosity, gradients, and vehicle running speeds, road information allowing for recovering various road configurations should be transmitted.

Therefore, the necessity of a technique of compressing, transmitting, and recovering such road information has emerged.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an apparatus and method of processing road data (or road information) capable of restoring road information close to an actual road configuration.

Various aspects of the present invention have also been made in an effort to provide an apparatus and method of processing road information capable of reducing a load of calculation for restoring road information.

Various aspects of the present invention have also been made in an effort to provide an apparatus and method of processing road information capable of inputting and outputting a reduced amount of data to restore road information.

Various aspects of the present invention provide for an apparatus for processing road information including: a global positioning system (GPS) sensor configured to detect a location of a vehicle; a navigation device configured to output short-range road information and long-range road information according to a location of the vehicle; and a vehicle controller configured to restore forward road information by using the short-range road information and the long-range road information and control an engine or a transmission according to the forward road information.

The navigation device may output the short-range road information and the long-range road information at predetermined time intervals.

The vehicle controller may restore the forward road information by accumulating the short-range road information and the long-range road information output at predetermined time intervals.

The vehicle controller may restore the forward road information in further consideration of a movement distance of the vehicle within a predetermined time.

The short-range road information and the long-range road information may include information regarding spots of a road spaced apart from one another at a predetermined distance therebetween, respectively.

A predetermined distance of the short-range road information may be a first distance, a predetermined distance of the long-range road information may be a second distance, and the second distance may be greater than the first distance.

The vehicle controller may restore forward road information corresponding to spots within sports of a road spaced apart from each other at a predetermined distance therebetween, by using the forward road information restored based on the short-range road information and the long-range road information.

Various aspects of the present invention provide for a method for processing road information, including: detecting a location of a vehicle; detecting short-range road information and long-range road information corresponding to a location of the vehicle; and restoring forward road information by using the short-range road information and the long-range road information.

The apparatus and method of processing road information according to various aspects of the present invention have the following advantages.

According to various aspects of the present invention, road information can be restored to be close to an actual road configuration.

Also, according to various aspects of the present invention, a load of calculation for restoring road information can be reduced.

Also, according to various aspects of the present invention, data for restoring road information can be easily transmitted even through a small bandwidth or communication at a low speed.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following description, usage of suffixes such as 'module', 'part' or 'unit' used for referring to elements is given merely to facilitate explanation of the present invention, without having any significant meaning by itself.

Figure 1:
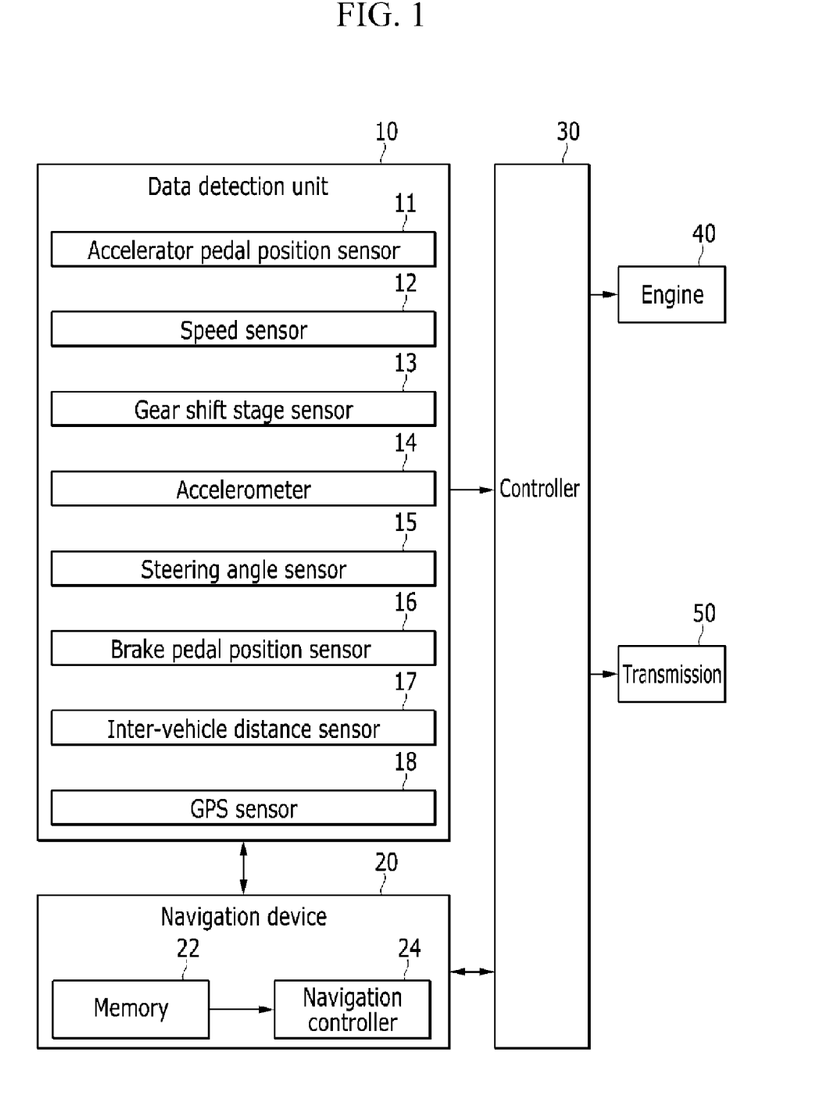
FIG. 1 is a block diagram of an exemplary apparatus for processing road information according to the present invention.

FIG. 1 is a block diagram of an apparatus for processing road information according to various embodiments of the present invention.

As illustrated in FIG. 1, the apparatus for processing road information according to various embodiments of the present invention may include a data detection unit 10, a navigation device 20, a vehicle controller 30, an engine 40, and a transmission 50.

Hereinafter, constituent elements will be described in turn.

The data detection unit 10 may detect data for determining a running state of a vehicle and a driving style of a driver, and data measured by the data detection unit 10 is transferred to the vehicle controller 30. The data detection unit 10 may include an accelerator pedal position sensor 11, a vehicle speed sensor 12, a gear stage sensor 13, an accelerometer 14, a steering angle sensor 15, a brake pedal position sensor 16, an inter-vehicle distance sensor 17, and a global positioning system (GPS) sensor 18.

The accelerator pedal position sensor 11 measures a degree of pressing an accelerator pedal by a driver. Namely, the accelerator pedal position sensor 11 measures data related to a driver's acceleration intention.

The vehicle speed sensor 12 measures a speed of a vehicle and is installed in a wheel of the vehicle.

Meanwhile, a target gear stage may be calculated by using a gear shift pattern on the basis of a signal from the accelerator pedal position sensor 11 and a signal from the vehicle speed sensor 12, and a gear shift to the target gear stage may be controlled.

In case of an automatic transmission having a plurality of planetary gear sets and a plurality of frictional elements, hydraulic pressure supplied to the plurality of frictional elements or released from the plurality of frictional elements is regulated.

Also, in case of a double clutch transmission, a current applied to a plurality of synchronizer mechanisms and actuators is controlled.

The gear stage sensor 13 detects a currently coupled gear shaft stage.

The accelerometer 14 detects acceleration of the vehicle. In addition to the vehicle speed sensor 12, the accelerometer 14 is installed to directly detect acceleration of the vehicle, or acceleration of the vehicle may be calculated by differentiating a vehicle speed detected by the vehicle speed sensor 12.

The steering angle sensor 15 detects a steering angle of the vehicle. Namely, the steering angle sensor 15 detects a direction in which the vehicle intends to move.

The brake pedal position sensor 16 detects whether a brake pedal is depressed. Namely, the brake pedal position sensor 16 detects the driver's acceleration intent together with the acceleration pedal position sensor 11.

The inter-vehicle distance sensor 17 detects a distance from the driver's vehicle to the car ahead. As the inter-vehicle distance sensor 17, various sensors such as an ultrasonic sensor, an infrared sensor, and the like, may be used.

The GPS sensor 18 is a sensor for acquiring a location of the vehicle. According to current technologies, the GPS sensor 18 may calculate information regarding distances from three or more satellites and time information and apply trigonometry to the calculated information to accurately calculate a 3D current location information based on the latitude, the longitude, and the altitude. Currently, a method of calculating location and time information by using three satellites and correcting an error of the calculated location and time information by using a single satellite is commonly used. Also, the GPS sensor 18 may calculate information regarding a speed of a vehicle by continuously calculating a current location of the vehicle in real time.

The navigation device 20 is a device providing information regarding a route to a destination to the driver. The navigation device 20 may include a memory 22 storing compressed information regarding forward roads and a navigation controller 24 performing a general control of the navigation device 20.

Also, the navigation device 20 includes a wireless communication unit. The wireless communication unit may include one or more modules allowing for wireless communication between the navigation device 20 and a wireless communication system or between the navigation device 20 and a network in which the navigation device 20 is located.

The navigation device 20 may receive information regarding the vehicle from the data detection unit 10. The navigation device 20 may output information regarding a forward road to the vehicle controller 30 by using the information received from the data detection unit 10.

The navigation device 20 described in the present disclosure may include a cellular phone, a smartphone, a notebook computer (or a laptop computer), a digital broadcast terminal, a personal digital assistant (PDA), a portable multimedia player (PMP), and the like.

The memory 22 may store a program for processing and controlling of the navigation controller 24 or may serve to temporarily store input/output data (e.g., data detected by the data detection unit 10, map data of the navigation device 20, or the like). The memory 22 may store frequency in use of each data.

The memory 22 may include at least one type of storage medium among a flash memory type, a hard disk type, a card type memory (e.g., an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The apparatus of processing road information may operate in relation to a Web storage performing a storage function of the memory 22 on the Internet.

The vehicle controller 30 may control the engine 40 or the transmission 50 based on information output from the data detection unit 10 or the navigation device 20.

The vehicle controller 30 may restore information regarding a forward road (or forward road information) by using the short-range road information and the long-range load information output from the navigation device 20.

The vehicle controller 30 may determine conditions of a road on which the vehicle is currently running, on the basis of the forward road information. The road conditions include a unique road shape such as a winding road or a gradient road.

Also, the vehicle controller 30 may determine a driving style of the driver on the basis of the data detected by the data detection unit. The vehicle controller 30 may change a gear shift pattern, a sense of coupling to a target gear stage, an engine torque map and/or an engine torque filter according to the determined driving style.

Various embodiments described herein may be implemented within a recording medium that may be read by a computer or a similar device by using software, hardware, or a combination thereof, for example.

According to hardware implementation, the various embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units designed to perform any other functions. In some cases, the various embodiments described in the present disclosure may be implemented by the navigation controller 24 or the vehicle controller 30 itself.

According to software implementation, various embodiments such as procedures and functions described in various embodiments may be implemented by separate software modules. Each of the software modules may perform one or more functions and operations described in the present disclosure. A software code may be implemented by a software application written in an appropriate program language.

Hereinafter, an actual road, long-range road information, short-range road information, and forward road information will be described with reference to FIG. 2.

Figure 2:
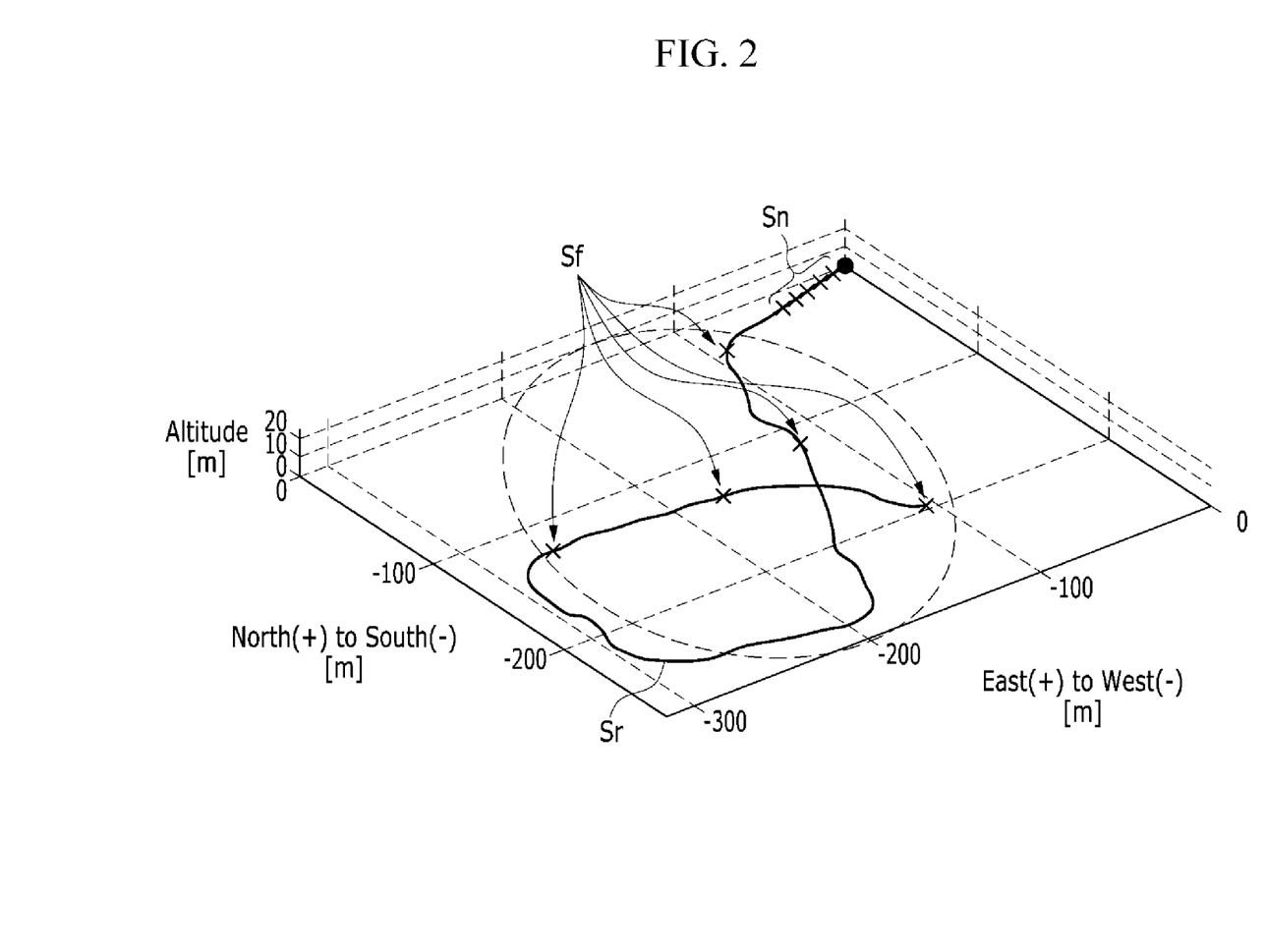
FIG. 2 is a view illustrating short range road information and long range road information, together with an actual road, as an exemplary three-dimensional (3D) coordinates system according to the present invention.

FIG. 2 is a view illustrating short range road information Sn and long range road information Sf, together with an actual road Sr, as a three-dimensional (3D) coordinates system according to various embodiments of the present invention.

As illustrated, the short-range information Sn may include information regarding 3D coordinates of a plurality of spots on the actual road Sr located within a predetermined distance from a reference spot, and the long-range information Sf may include information regarding 3D coordinates of a plurality of spots on the actual road Sr located beyond the predetermined distance from the reference spot.

In a case in which the short-range road information Sn and the long-range road information Sf are expressed as topology information based on the latitude and longitude, the vehicle controller 30, which receives the information and restores forward road information, should perform calculation to convert the short-range road information and the long-range road information into distances, and conversion information according to the latitude and longitude for correcting the forward road information according to the latitude and longitude is required.

Thus, a location of a front side $d(1)$ from the reference spot is $p(1)$, a location of a front side $d(2)$ is $p(2)$ as a relative distance from $d(1)$, a location of a front side $d(n)$ is $p(n)$ as a relative distance from $d(n-1)$, a relative distance between $d(i-1)$ and $d(i)$ is defined by an east-west directional relative distance $ew(i)$, a north-south directional relative distance $ns(i)$, and a relative altitude $h(i)$, and an aggregation of the information is classified into the short-range road information Sn and the long-range road information Sf and transmitted.

For example, the short-range road information Sn may be represented by Equation 1 below.

$$Sn=\{(d, ew, nd, h): (10\text{ m}, -4.53\text{ m}, 8.9\text{ m}, -0.31\text{ m}), \\ (20\text{ m}, -4.69\text{ m}, 8.91\text{ m}, 0.63\text{ m}), (30\text{ m}, -4.12\text{ m}, 8.99\text{ m}, -0.51\text{ m}), (40\text{ m}, -4.02\text{ m}, 9.2\text{ m}, -0.41\text{ m}), (50\text{ m}, -3.59\text{ m}, 9.38\text{ m}, 0\text{ m})\}$$ (Equation 1)

Also, the long-range road information Sf may be represented by Equation 2 below.

$$Sf=\{(d, ew, ns, d): (100\text{ m}, 2.81\text{ m}, -49.8\text{ m}, -1.56\text{ m}), \\ (200\text{ m}, 16.3\text{ m}, -98.44\text{ m}, -3.13\text{ m}), (600\text{ m}, 2.23\text{ m}, -46.8\text{ m}, -2.56\text{ m}), (700\text{ m}, 4.81\text{ m}, -20.8\text{ m}, -1.56\text{ m}), (800\text{ m}, 91.10\text{ m}, 35.94\text{ m}, 3.13\text{ m})\}$$ (Equation 2)

The short-range road information Sn includes a plurality of pieces of location information corresponding to the plurality of locations within the predetermined distance from the reference spot, and the plurality of locations may be separated by a first distance, respectively.

The long-range road information Sf includes a plurality of pieces of location information corresponding to a plurality of locations beyond the predetermined distance from the reference spot, and the plurality of locations may be separated by a second distance, respectively.

The forward road information S may include information regarding each spot on the road separated by the predetermined distance k. Here, the predetermined distance k may include a minimum distance among the relative distances p1 to pn or a divisor of the minimum distance.

Then, information regarding a forward road at a first spot separated from the reference spot by the predetermined distance k may be represented by $s(1)$, information regarding a forward road at a second spot separated from the first spot by the predetermined distance k may be represented by $s(2)$, and information regarding a forward road of the nth spot $d(n)$ separated from the (n−1) spot by the predetermined distance k may be represented by $s(n)$.

Namely, the forward road information S may include the information regarding a forward road at the first spot to the information regarding the forward road at the nth spot as represented by Equation 3 below.

$$S=\{s(j): j=1, \ldots, n)\} \quad \text{(Equation 3)}$$

And, s(j) may include da(j), dr(j), ewr(j), nsr(j) and hr(j) data. da(j) refers to data of a distance from a jth spot on the road to the reference spot, dr(j) refers to data of a relative distance from (j−1)th spot to the jth spot, ewr(j) refers to data of an east-west directional relative distance from the (j−1)th spot to the jth spot, nsr(j) refers to data of a north-south directional relative distance from the (j−1)th spot to the jth spot, and hr(j) refers to data of a relative altitude between the (j−1)th spot and the jth spot.

The vehicle controller 30 restores forward road information regarding a plurality of spots included in the short-range road information Sn1 and the long-range road information Sf1 received from the navigation device 20, and in this case, forward road information between the respective spots may be restored by using the forward road information restored from the short-range road information Sn1 and the long-range road information Sf1.

For example, it is assumed that an aggregation of forward road information restored from the information Sn1 regarding a short-range road to the nth spot and the information Sf1 regarding a long-range road is Sk_1, and an aggregation of forward road information excluding Sk_1 is Sl_1. Then, among the pieces of forward road information of the aggregation Sl_1, information regarding a forward road of the spot positioned between two continuous spots p and p+1 included in the aggregate Sk_1 is restored with a value based on linear interpolation of sk_1(p) and sk_1 p+1.

After the lapse of a predetermined time T, when new information Sn2 regarding a short-range road and new information Sf2 regarding a long-range road are received, the vehicle controller 30 may restore the forward road information S converged on the actual road Sr by using Sk_2 and Sk_1 restored by using the short-range road information Sn2 and long-range road information Sf2.

Figure 3:
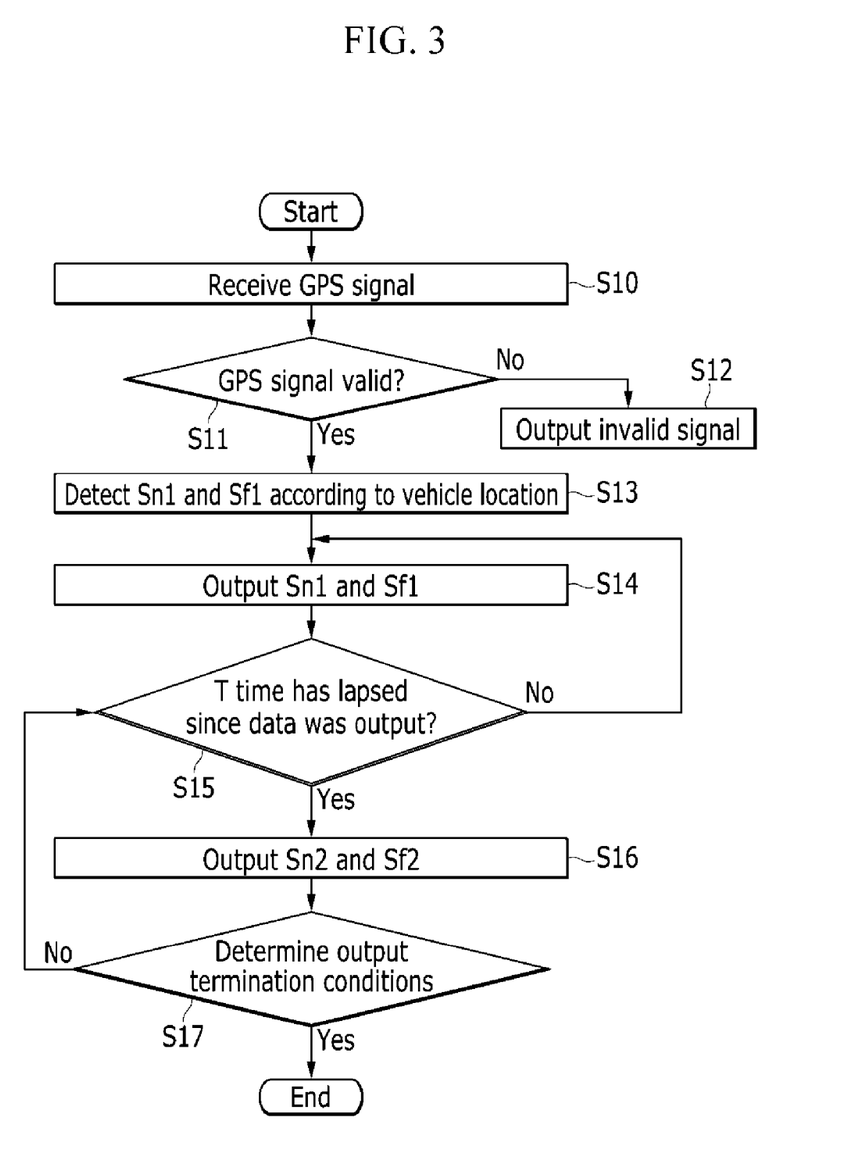
FIG. 3 is a flow chart illustrating an exemplary method of outputting short range road information and long range road information by a navigation device according to the present invention.

Hereinafter, a method of outputting the short-range road information Sn and the long-range road information Sf by the navigation device 20 to the vehicle controller 30 will be described.

FIG. 3 is a flow chart illustrating a method of outputting short range road information and long range road information by the navigation device according to various embodiments of the present invention. First, the navigation controller 24 receives a GPS signal from the GPS sensor (S10). The navigation controller 24 determines validity of the GPS signal (S11).

When the GPS signal is not valid, the navigation controller 24 may output an invalid signal to the GPS sensor 18 or the vehicle controller 30, and receive a GPS signal again.

When the GPS signal is valid, the navigation controller 24 detects the first short-range road information Sn1 and the first long-range road information Sf1 by using a location of the vehicle determined based on the GPS signal from the memory 22 (S13).

The navigation controller 24 outputs the detected first short-range road information Sn1 and the first long-range road information Sf1 to the vehicle controller 30 (S14).

Thereafter, the navigation controller 24 determines whether a predetermined time T has lapsed since the first short-range road information Sn1 and the first long-range road information Sf1 was output (S15).

When it is determined that the predetermined time T has lapsed, the navigation controller 24 outputs the second short-range road information Sn2 and the second long-range road information Sf2 to the vehicle controller 30 (S16). The navigation controller 24 determines output termination conditions (S17).

For example, when the ignition is turned off or an input for stopping transmission of the short-range road information Sn and the long-range road information Sf is received from the driver, the navigation controller 24 may terminate outputting of the short-range road information Sn and the long-range road information Sf.

When it is determined that the output termination conditions are not met, the navigation controller 24 outputs the second short-range road information Sn2 and the second long-range road information Sf2, and thereafter, the navigation controller 24 determines again whether the predetermined time T has lapsed (S15).

Hereinafter, a method of restoring forward road information by the vehicle controller 30 which has received the short-range road information Sn and the long-range road information Sf will be described with reference to FIG. 4.

Figure 4:
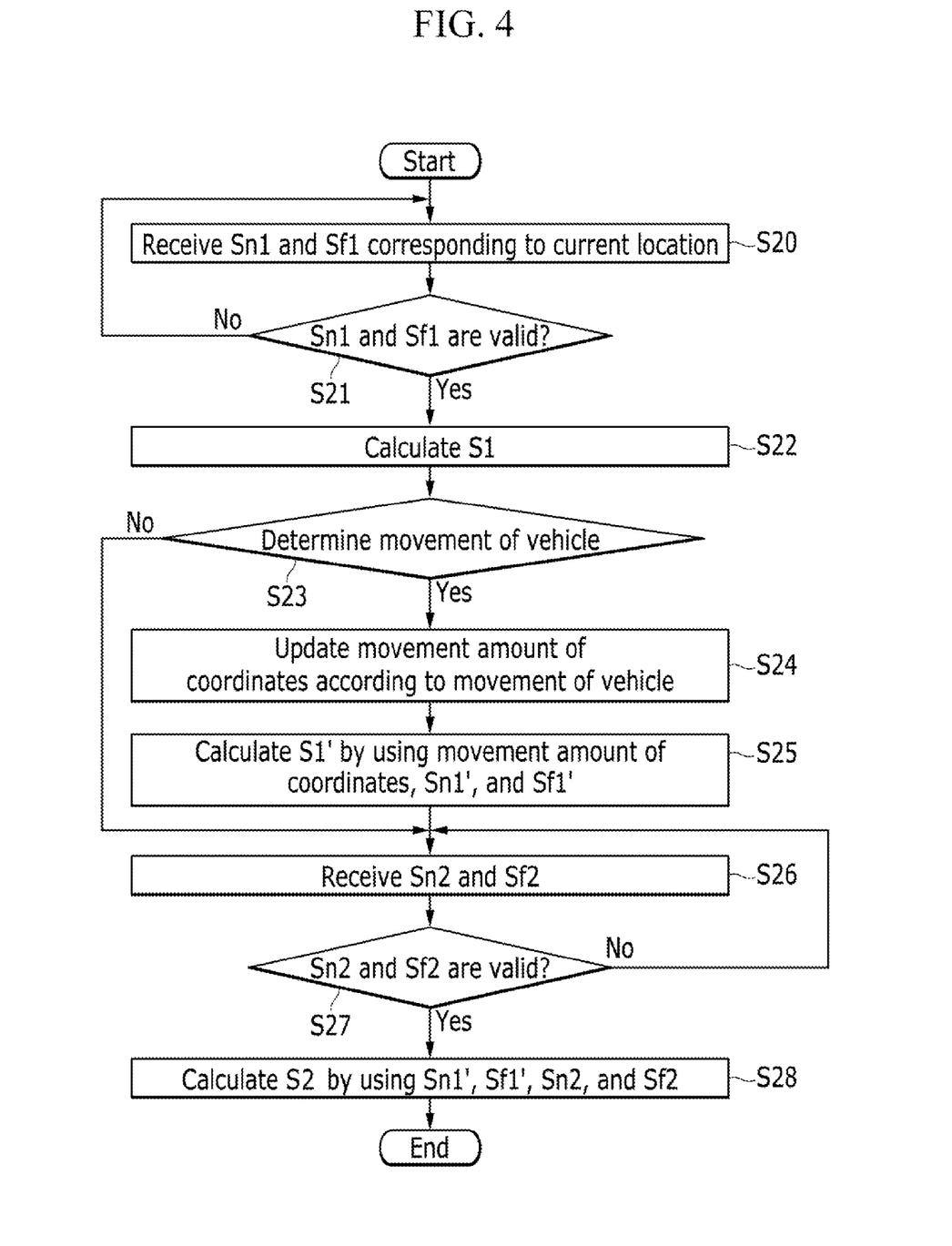
FIG. 4 is a flow chart illustrating an exemplary method of restoring forward road information by a apparatus of processing road information according to the present invention.

FIG. 4 is a flow chart illustrating a method of restoring forward road information by a apparatus of processing road information according to various embodiments of the present invention. First, the vehicle controller 30 receives the first short-range road information Sn1 and the first long-range road information Sf1 output from the navigation controller 24 (S20).

Next, the vehicle controller 30 determines validity of the received first short-range road information Sn1 and the first long-range road information Sf1.

When it is determined that the first short-range road information Sn1 and the first long-range road information Sf1 are not valid, the vehicle controller 30 may receive the first short-range road information Sn1 and the first long-range road information Sf1 again (S20).

When it is determined that the first short-range road information Sn1 and the first long-range road information Sf1 are valid, the vehicle controller 30 calculates first forward road information S1 by using the first short-range road information Sn1 and the first long-range road information Sf1 (S22).

The vehicle controller 30 determines whether the vehicle has moved by using data received from the data detection unit 10 (S23). For example, the vehicle controller 30 may determine whether the vehicle has moved by using a speed of the vehicle sensed by the vehicle speed sensor 12. Alternatively, the vehicle controller 30 may determine whether the vehicle has moved by using a location of the vehicle output from the GPS sensor 18.

When it is determined that the vehicle has moved, the vehicle controller 30 updates a movement amount of coordinates according to a movement of the vehicle (S24). For example, the vehicle controller 30 may calculate a distance by which the vehicle has moved by using the speed of the vehicle sensed by the vehicle speed sensor 12, and update a movement amount of the coordinates based on the movement distance of the vehicle. Alternatively, the vehicle controller 30 may calculate a distance by which the vehicle has moved by using a location of the vehicle output from the GPS sensor 18, and update a movement amount of the coordinates based on the movement distance of the vehicle.

The vehicle controller 30 restores first forward road information S1' after the vehicle movement, in further consideration of the movement amount of coordinates and the distance by which the vehicle has moved from the reference point of the first short-range road information Sn1' and the first long-range road information Sf1' after the movement of the vehicle (S25).

The vehicle controller 30 may restore the first forward road information S1' after the movement of the vehicle by using the first short-range road information and the first long-range road information Sn1' and Sf1', excluding the information regarding the road corresponding to a location which the vehicle has ran to reach, among the first short-range road information and the first long-range road information Sn1 and Sf1.

For example, when the vehicle has moved 20 m, the vehicle controller 30 may restore the first forward road information S1' after the movement of the vehicle by using 30 m road information, 40 m road information, and 50 m road information, excluding 10 m road information and 20 m road information, namely, information regarding roads corresponding to 10 m and 20 m, the locations which the vehicle has ran to reach, among 10 m road information, 20 m road information, 30 m road information, 40 m road information, and 50 m road information included in the first short-range road information Sn1.

Thereafter, when it is determined that the vehicle has moved, the vehicle controller 30 receives the second short-range road information Sn2 and the second long-range road information Sf2 from the navigation controller 24 (S26).

Then, the vehicle controller 30 determines validity of the second short-range road information Sn2 and the second long-range road information Sf2 (S27).

When it is determined that the second short-range road information Sn2 and the second long-range road information Sf2 are valid, the vehicle controller 30 restores the second forward road information S2 by using the first short-range road information Sn1', the first long-range road information Sf1', the second short-range road information Sn2, and the second long-range road information Sf2 after the movement of the vehicle.

When it is determined that the second short-range road information Sn2 and the second long-range road information Sf2 are not valid, the vehicle controller 30 may receive the second short-range road information Sn2 and the second long-range road information Sf2 again (S26).

Hereinafter, the short-range road information Sn, the long-range road information Sf, and the forward road information S will be described with reference to FIGS. 5 and 6.

Figure 5:
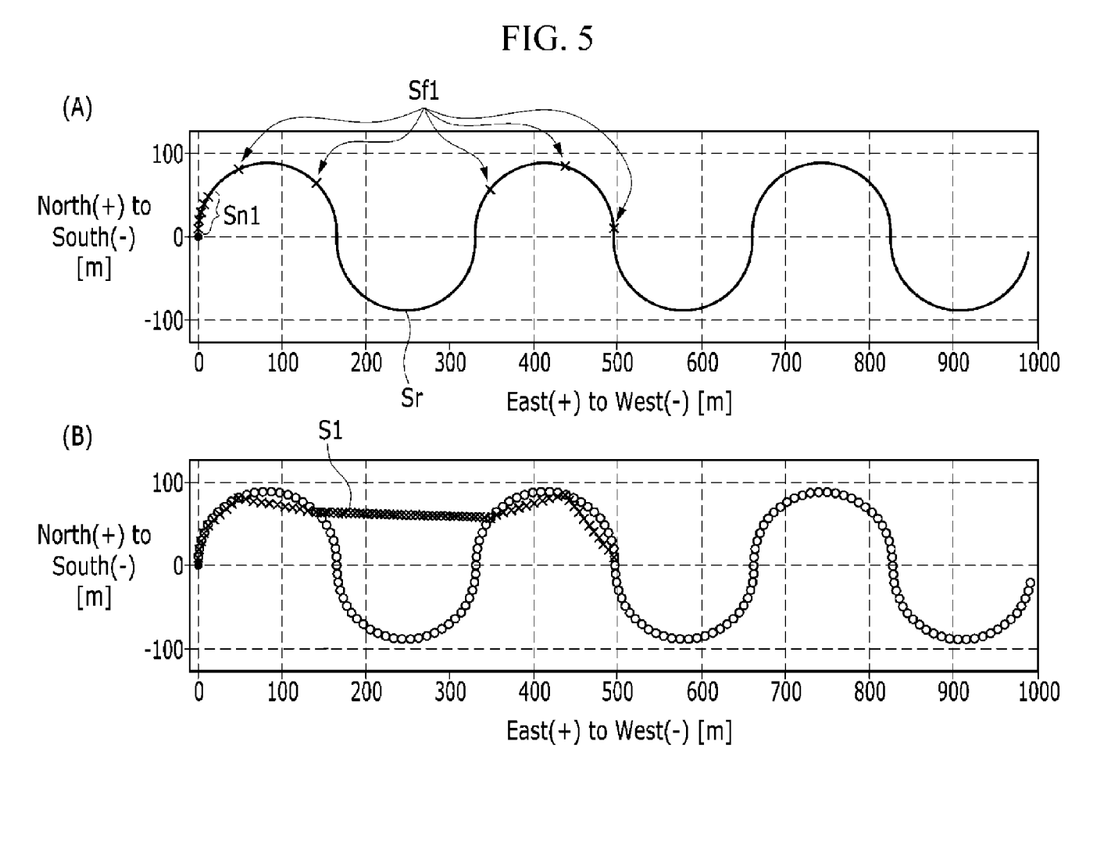
FIG. 5(A), FIG. 5(B), FIG. 6(A) and FIG. 6(B) are views illustrating forward road information restored by an exemplary apparatus of processing road information according to the present invention.
Figure 6:
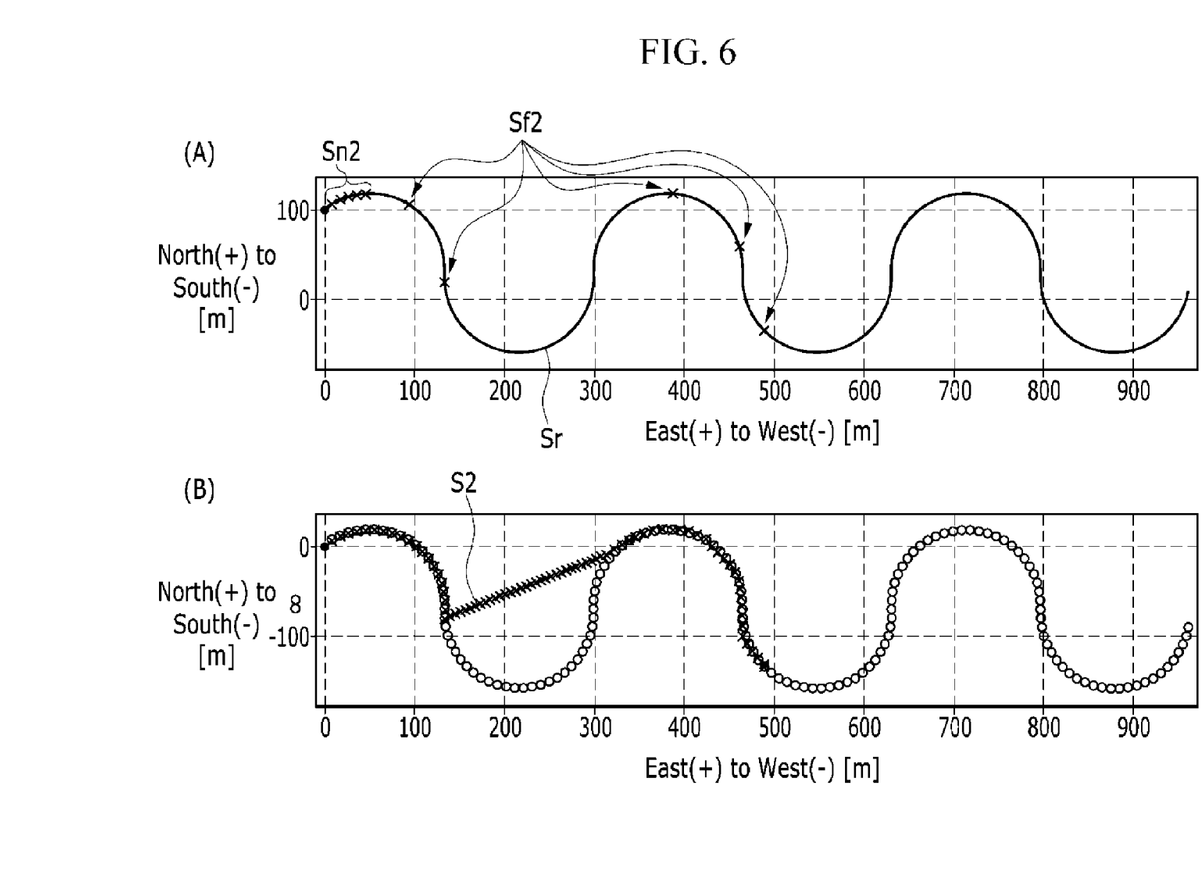

FIGS. 5 and 6 are views illustrating forward road information restored by the apparatus of processing road information according to various embodiments of the present invention. As illustrated in FIG. 5A, the vehicle controller 30 may receive the first short-range road information Sn1 regarding a plurality of locations within a predetermined distance from a reference spot of the actual road S4 and first long-range road information Sf1 regarding a plurality of locations beyond the predetermined distance from the reference point of the actual road Sr.

Then, as illustrated in FIG. 5B, the vehicle controller 30 may restore the first forward road information 51 by using the first road information Sn1 and the first long-range road information Sf1.

After the lapse of the predetermined time T, as illustrated in FIG. 6A, the vehicle controller 30 may receive the second short-range road information Sn2 and the second long-range road information Sf2.

Then, as illustrated in FIG. 6B, the vehicle controller 30 may restore the second forward road information S2 by using the first short-range road information Sn1', the first long-range road information Sf1', the second short-range road information Sn2, and the long-range road information Sf2 after the movement of the vehicle.

For convenience in explanation and accurate definition in the appended claims, the terms rear and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for processing road data, the apparatus comprising:
    a global positioning system (GPS) sensor configured to detect a location of a vehicle;
    a navigation device configured to output short-range road data and long-range road data according to a location of the vehicle; and
    a vehicle controller configured to restore forward road information by using the short-range road data and the long-range road data and control an engine or a transmission according to the forward road data restored by the vehicle controller, by changing one or more of a gear shift pattern and an engine torque map,
    wherein the navigation device periodically outputs p(1) and p(i) to the vehicle controller, where i is from 2 to n and p(1) is a relative location of d(1) with respect to a current location of the vehicle, and p(i) is relative location of d(i) with respect to d(i+1),
    wherein the d(1) includes an east-west directional relative distance ew(1), a north-south directional relative distance ns(1), and a relative altitude h(1), with respect to the current location of the vehicle,
    wherein each of the d(i) where i is equal to 1−n, includes an east-west directional relative distance ew(i), a north-south directional relative distance ns(i), and a relative altitude h(i), with respect to the d(i−1),
    wherein a set of the d(i) where i is equal to 1−n, includes a plurality of short-range road data (Sn) and a plurality of long-range road data (Sf), and
    wherein the plurality of short-range road data (Sn) includes the p(i) which is less than a predetermined distance and the plurality of long-range road data (Sf) includes the p(i) which is larger than the predetermined distance, and
    wherein the vehicle controller updates a movement amount of coordinates according to a movement of the vehicle and then restores the short-range and long range road data Sn and Sf with respect to the current location of the vehicle.

2. The apparatus of claim 1, wherein the navigation device outputs the short-range road information and the long-range road information at predetermined time intervals.

3. The apparatus of claim 2, wherein the vehicle controller restores the forward road information by accumulating the short-range road data and the long-range road data output at predetermined time intervals.

4. The apparatus of claim 3, wherein the vehicle controller restores the forward road data in further consideration of a movement distance of the vehicle within a predetermined time.

5. The apparatus of claim 1, wherein the short-range road data regarding spots of a road spaced apart from one another at a first predetermined distance therebetween, and the long-range road data includes data regarding spots of a road spaced apart from one another at a second predetermined distance therebetween.

6. The apparatus of claim 5, wherein the first predetermined distance of the short-range road data is a first distance, the second predetermined distance of the long-range road data is a second distance, and the second distance is greater than the first distance.

7. The apparatus of claim 5, wherein the vehicle controller restores forward road data corresponding to spots within sports of a road spaced apart from each other at the first and second predetermined distance therebetween by using the forward road data restored based on the short-range road data and the long-range road data.

8. A method for processing road data, the method comprising:
  detecting, by a global positioning system (GPS), a location of a vehicle;
  detecting, by a navigation device, short-range road data and long-range road data corresponding to the location of the vehicle; and
  restoring, by a vehicle controller, forward road data by using the short-range road data and the long-range road data; and
  controlling, by the vehicle controller, an engine or a transmission according to the forward road data restored by the vehicle controller, by changing one or more of a gear shift pattern and an engine torque map,
  wherein the navigation device periodically outputs p(1) and p(i) to the vehicle controller, where i is from 2 to n and p(1) is a relative location of d(1) with respect to a current location of the vehicle, and p(i) is relative location of d(i) with respect to d(i−1),
  wherein the d(1) includes an east-west directional relative distance ew(1), a north-south directional relative distance ns(1), and a relative altitude h(1), with respect to the current location of the vehicle,
  wherein each of the d(i) where i is equal to 1−n, includes an east-west directional relative distance ew(i), a north-south directional relative distance ns(i), and a relative altitude h(i), with respect to the d(i−1),
  wherein a set of the d(i) where i is equal to 1−n, includes a plurality of short-range road data (Sn) and a plurality of long-range road data (Sf), and
  wherein the plurality of short-range road data (Sn) includes the p(i) which is less than a predetermined distance and the plurality of long-range road data (Sf) includes the p(i) which is larger than the predetermined distance, and
  wherein the vehicle controller updates a movement amount of coordinates according to a movement of the vehicle and then restores the short-range and long rang road data Sn and Sf with respect to the current location of the vehicle.

9. The method of claim 8, wherein in the detecting of the short-range road data and the long-range road data, the short-range road data and the long-range road data are detected at predetermined time intervals.

10. The method of claim 9, wherein in the restoring of the forward road data, the forward road data is restored by accumulating the short-range road data and the long-range road data detected at the predetermined time intervals.

11. The method of claim 10, wherein in the restoring of the forward road data, the forward road information is restored in further consideration of a movement distance of the vehicle within a predetermined time.

12. The method of claim 10, wherein the short-range road data regarding spots of a road spaced apart from one another at a predetermined distance therebetween, and the long-range road data includes data regarding spots of a road spaced apart from one another at a second predetermined distance therebetween.

13. The method of claim 12, wherein a predetermined distance of the short-range road data is a first distance, the second predetermined distance of the long-range road data is a second distance, and the second distance is greater than the first distance.

* * * * *